United States Patent
Ueberschär et al.

(10) Patent No.: US 10,507,765 B2
(45) Date of Patent: Dec. 17, 2019

(54) METHOD, DEVICE AND COMPUTER-READABLE STORAGE MEDIUM WITH INSTRUCTIONS FOR IDENTIFYING AN EXIT SIDE OF A MOTOR VEHICLE

(71) Applicant: Volkswagen Aktiengesellschaft, Wolfsburg (DE)

(72) Inventors: Frederik Ueberschär, Wildeshausen (DE); Daniel Palzer, Berlin (DE)

(73) Assignee: VOLKSWAGEN AKTIENGESELLSCHAFT, Wolfsburg (DE)

( * ) Notice: Subject to any disclaimer, the term of this patent is extended or adjusted under 35 U.S.C. 154(b) by 0 days.

(21) Appl. No.: 16/139,345

(22) Filed: Sep. 24, 2018

(65) Prior Publication Data
US 2019/0092232 A1    Mar. 28, 2019

(30) Foreign Application Priority Data
Sep. 26, 2017    (DE) .......................... 10 2017 217 074

(51) Int. Cl.
*B60Q 9/00* (2006.01)
*B60Q 1/52* (2006.01)
*B60Q 3/80* (2017.01)
*B60Q 3/70* (2017.01)

(52) U.S. Cl.
CPC .............. *B60Q 9/00* (2013.01); *B60Q 1/525* (2013.01); *B60Q 3/70* (2017.02); *B60Q 3/80* (2017.02)

(58) Field of Classification Search
CPC ...... B60L 2270/42; B60Q 3/267; B60Q 5/008
USPC ........................................................ 340/425.5
See application file for complete search history.

(56) References Cited

U.S. PATENT DOCUMENTS

| 7,987,030 B2 | 7/2011 | Flores et al. ................ 701/36 |
| 9,087,417 B2 | 7/2015 | Reuschel et al. |
| 2004/0119823 A1* | 6/2004 | Takagi .................. H04N 7/181 348/148 |
| 2008/0143139 A1* | 6/2008 | Bauer .................... E05C 17/00 296/146.1 |
| 2013/0088578 A1 | 4/2013 | Umezawa et al. ............. 348/47 |
| 2015/0217689 A1 | 8/2015 | Frik et al. ................... 340/436 |

(Continued)

FOREIGN PATENT DOCUMENTS

| AT | 517270 A1 | 12/2016 | ............. B16L 15/00 |
| DE | 10312252 A1 | 9/2004 | ............. B60R 21/01 |
| DE | 102004061689 A1 | 7/2006 | ............. E05C 17/58 |

(Continued)

OTHER PUBLICATIONS

German Office Action, Application No. 102017217074.3, 6 pages, dated Jul. 10, 2018.

*Primary Examiner* — Fabricio R Murillo Garcia
(74) *Attorney, Agent, or Firm* — Slayden Grubert Beard PLLC (57) ABSTRACT

A method, a device and a computer-readable storage medium with instructions for identifying an exit side of a motor vehicle. In a first step, the existence of an exit situation is detected. If an exit situation exists, an exit side of the motor vehicle is ascertained. Finally, the opening of a door is simulated on the ascertained exit side. For example, a brightness can be increased on the ascertained exit side, outside sounds can be reproduced, or an air stream can be generated.

9 Claims, 4 Drawing Sheets

(56) References Cited

U.S. PATENT DOCUMENTS

2017/0217364 A1 8/2017 Noboritate et al.
2018/0222384 A1* 8/2018 Dudar .................. B60W 10/06

FOREIGN PATENT DOCUMENTS

| DE | 102006024194 A1 | 12/2006 | ............... B60Q 3/02 |
|----|-----------------|---------|---------------------------|
| DE | 102006024609 A1 | 11/2007 | ............... B60R 1/00 |
| DE | 102008012898 A1 | 9/2009  | ............... G08G 1/16 |
| DE | 102008064022 A1 | 9/2009  | ........... G08G 1/0962   |
| DE | 102009012242 A1 | 10/2010 | ............... B60Q 5/00 |
| DE | 102010020811 A1 | 11/2011 | ............ B60R 21/02   |
| DE | 102011014263 A1 | 9/2012  | ............... B60Q 3/02 |
| DE | 102012015753 A1 | 2/2014  | ............... B60Q 3/00 |
| DE | 102012218482 A1 | 6/2014  | ............... B60Q 5/00 |
| DE | 102014226187 A1 | 6/2016  | ............... B60Q 9/00 |
| DE | 102015200160 A1 | 7/2016  | ............... G09F 9/00 |
| DE | 102015006425 A1 | 11/2016 | ............... B60Q 3/02 |
| EP | 3124350 A1      | 2/2017  | ............... B61B 1/02 |

* cited by examiner

METHOD, DEVICE AND COMPUTER-READABLE STORAGE MEDIUM WITH INSTRUCTIONS FOR IDENTIFYING AN EXIT SIDE OF A MOTOR VEHICLE

CROSS-REFERENCE TO RELATED APPLICATIONS

This application claims priority to DE Application No. 10 2017 217 074.3 filed Sep. 26, 2017 with the German Patent and Trademark Office, the contents of which application are hereby incorporated by reference in their entireties.

TECHNICAL FIELD

The present invention relates to a method, device and computer-readable storage medium with instructions for identifying an exit side of a motor vehicle. The invention furthermore relates to a motor vehicle in which a method according to the invention, or device according to the invention, is used.

In road traffic, there is a plurality of situations in which a potential hazard exists. Most of these situations relate to the movement of a motor vehicle in flowing traffic. However, even when the motor vehicle is at a standstill, certain accident risks exist, in particular when a motor vehicle passenger wishes to exit the motor vehicle. The reason for this is frequently the inattentive opening of doors which then collide with other motor vehicles or bicyclists. To reduce such risks, a series of solution approaches are known from the prior art.

BACKGROUND

For example, DE 103 12 252 A1 describes a method for avoiding personal injury and property damage caused by motor vehicle doors of stopped or parked vehicles. The exterior adjacent to the motor vehicle is monitored with a camera. When a stopping procedure is identified or door unlocking is actuated, a monitoring mode is activated and an acoustic, visual or haptic warning signal is output to a vehicle passenger if a stationary or approaching object is detected that could lead to a collision with the door or the exiting vehicle passenger.

A similar approach is known from DE 10 2012 015 753 A1, which describes a method for warning a user of a motor vehicle of a hazard of the motor vehicle colliding with an object. If a collision hazard is identified, the user is warned of the collision hazard by means of an interior lighting device intended for lighting an interior of the motor vehicle. For example, a light color, a light intensity or a lighting location can be changed.

Moreover, DE 10 2010 020 811 A1 describes a door lock with a lighted inner handle for a motor vehicle. When the inner handle is actuated, sensors are activated that detect the surroundings of the motor vehicle. If a road user is identified in the surroundings, a warning of the vehicle passenger occurs. For this, a visual warning can be output by the lighted inner handle or an acoustic warning.

In the aforementioned approaches, the vehicle passenger is regularly warned taking into account an exit side. This is determined by the door that the vehicle passenger is wanting to open. The warning can however be independent of an exit side. In this case, potential risks in the entire surroundings of the motor vehicle are detected.

With motor vehicles today, the exit side for a vehicle passenger is normally determined by the seat of the vehicle passenger in the motor vehicle. Accordingly, the driver normally exits the driver's side, and the passenger exits the passenger side.

The situation is less clear for vehicle passengers in the back seat of the motor vehicle. Normally, exiting is from the adjacent door, but this is not always the case. Moreover, there is no preferred exit side for a vehicle passenger on the center seat in the back seat. It can therefore be desirable to indicate to the vehicle passenger a preferred or recommendable exit side.

The indication of an exit side will become more important with the advent of autonomous motor vehicles and so-called robot taxis. With such motor vehicles, there is normally no preferred exit side for the vehicle passengers dictated by the design of the motor vehicle.

In this context, a method is known from DE 10 2008 012 898 A1 for outputting information on leaving a motor vehicle depending on a collision hazard when leaving the motor vehicle. The method is used in particular after an accident. The information indicates the exit of the motor vehicle through which one can leave with a minimum collision hazard. The collision hazard is determined depending on dynamic and static environmental conditions. The output can be acoustic by a voice command, visual by a display, and haptic by corresponding stimulations of the vehicle passengers. It is also provided to indicate the exit by opening the doors on the side on which it is possible to leave the motor vehicle with a minimum collision hazard.

SUMMARY

An object of the invention is to present improved solutions for identifying an exit side of the motor vehicle.

This object is achieved by a system for identifying an exit side of a motor vehicle and a motor vehicle according to the independent claims. Some embodiments of the invention are the subject matter of the dependent claims and the following description.

According to one aspect, a method for identifying an exit side of a motor vehicle comprises the steps:
  ascertaining an exit side of the motor vehicle; and
  simulating a door opening on the ascertained exit side.

According to another aspect, a computer-readable storage medium contains instructions that, while being executed by a computer, cause the computer to execute the following steps for identifying an exit side of a motor vehicle:
  ascertaining an exit side of the motor vehicle; and
  simulating a door opening on the ascertained exit side.

The term "computer" is to be interpreted broadly. In particular, it also comprises control units and other processor-based data processing devices.

According to a further aspect, a device for identifying an exit side of a motor vehicle comprises:
  an analytical unit for ascertaining an exit side of the motor vehicle; and
  a control unit for simulating a door opening on the ascertained exit side.

BRIEF DESCRIPTION OF THE DRAWINGS

Additional features and embodiments of the present invention can be found in the following description and the appended claims in conjunction with the figures.

The solution according to one aspect of the invention uses a simulation of the physical opening of at least one door in order to clarify the exit side to the vehicle passengers without actually performing the opening of the door. Reasons against an automated opening of the door are for example a hazardous situation in the surroundings of the vehicle, or the desire of the vehicle passenger to remain longer in the vehicle. By simulating a door opening, the exterior and the sealed interior are carefully united. By means of said careful uniting, the vehicle passenger can focus on the changed surroundings and embark on the transition between the two spaces in a comfortable manner.

According to some embodiments, brightness is increased at least in a door region at the ascertained exit side to simulate the opening of the door. For this, for example a luminosity of lighting can be changed, or a transparency of a window can be increased. Frequently, slightly darkened windowpanes are used in motor vehicles. By increasing the brightness, the immediate impression is therefore generated that a door was opened. If for example electrochemical windowpanes are installed with a transparency that is controllable, the transparency of a window can be increased by correspondingly controlling the windowpanes. Electrochemical windowpanes can for example be created based on PDLC glass (PDLC: polymer dispersed liquid crystal) or SPD glass (SPD: suspended particles device). Alternatively, the brightness of existing lighting can merely be increased. In this case, environmental parameters or the time of day can also be taken into consideration. Accordingly for example, increasing the transparency of a window at night when there is no outside light only has a slight effect, and it therefore may be one option to change to the lighting. When the sunlight is particularly bright, it can in turn be an option to only increase the transparency of the window slightly so that the vehicle passenger is not blinded.

According to some embodiments, outside sounds, at least in a door region on the ascertained exit side, are reproduced to simulate the opening of the door. In this case, the outside sounds can be simulated outside sounds, or real outside sounds detected by a microphone. Examples of simulated outside sounds are recorded real sounds that are retrieved from a memory, or artificial sounds generated based on simulation parameters. Outside sounds generally scarcely penetrate the interior of a motor vehicle due to the typical installed noise insulation. By reproducing outside sounds, the immediate impression is therefore generated that a door was opened. Here as well, environmental parameters or the time of day can be taken into consideration. In a loud environment or an unpleasant noise background, it can be beneficial to only reproduce simulated outside sounds instead of real outside sounds, or to filter the real outside sounds or reproduce them at a reduced volume. Likewise, relatively few real outside sounds occur at night, so it can be more reasonable to reproduce simulated outside sounds.

According to some embodiments, an air stream is generated at least in a door region at the ascertained exit side to simulate the opening of the door. The air flowing into the interior from the outside through an open door can be easily simulated with this air stream.

The described possibilities of simulating the opening of the door can be combined with each other as desired, wherein only individual approaches can also be used. Likewise, temporal sequences can be realized in that for example first the brightness is increased, and then outside noises and an air flow are only added after a certain time span.

By only simulating the changing stimuli of light, sound and air, the user is made aware of the door without experiencing potential complications from a physical opening of the door. By addressing several senses, the concept takes into account the feature of accessibility and can also be perceived by sight- or hearing-impaired users.

According to some embodiments, the exit side is ascertained with the assistance of vehicle sensors, or by means of a position of the motor vehicle from map data. For example, curbs, buildings, vehicles or persons in the surroundings of the motor vehicle can be detected based on data from the motor vehicle sensors. Whereas curbs, buildings or persons on one side of the motor vehicle indicate that exiting should occur from that side, detected vehicles are an indication that exiting should occur from the opposite side. On the basis of this information, a preferable exit side can therefore be easily determined. To the extent that the position of the motor vehicle is known, the exit side can alternatively also be taken directly from the available map data. This has the advantage that no evaluation of the sensor data is needed, during which errors may occur.

Particularly beneficial, a method according to the invention or a device according to the invention is used in a vehicle, in particular in a motor vehicle.

To better understand the principles of the present technology, the following embodiments will be explained in greater detail with reference to the figures. Of course, the invention is not restricted to these embodiments, and the described features may also be combined or modified without departing from the invention's scope of protection as defined in the appended claims.

Figure 1:
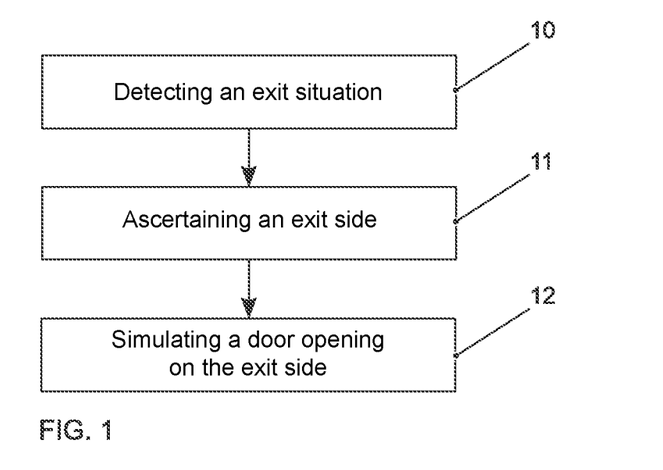
FIG. 1 schematically shows a method for identifying an exit side of a motor vehicle.

FIG. 1 schematically shows a method for identifying an exit side of a motor vehicle. In a first step, the existence of an exit situation is detected 10. The existence of an exit situation can for example be assumed when the motor vehicle has reached a previously detected driving goal, the driver has turned off the motor vehicle, or a vehicle passenger unlocks his safety belt when the motor vehicle is at a standstill. When an exit situation exists, an exit side of the motor vehicle is ascertained 11. For this, data from the motor vehicle sensors can be used in that for example curbs, buildings, vehicles or persons in the surroundings of the motor vehicle are detected in the surroundings of the motor vehicle. Alternatively, the exit side can also be ascertained by means of a position of the motor vehicle from map data. Finally, the opening of a door is simulated 12 on the ascertained exit side. For this, a brightness for example can be increased on the ascertained exit side, optionally over the entire length of the interior of the motor vehicle, or at least in a door region. To increase the brightness, a luminosity of lighting can be adapted. Alternatively or in addition, a transparency of a window can also be increased, such as when using electrochromic windowpanes. It is also possible to reproduce outside sounds, at least in a door region on the ascertained exit side to simulate the opening of the door. The outside noises can be simulated outside noises, or real outside noises detected by a microphone. An air stream generated at least in a door region on the ascertained exit side can be another possibility. Of course, all or some of the various approaches for simulating the opening of the door can also be combined or implemented in a desired temporal sequence.

Figure 2:
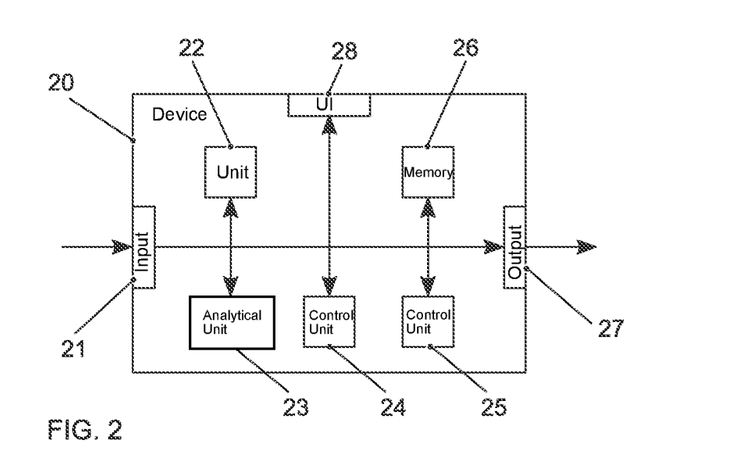
FIG. 2 shows a first embodiment of a device for identifying an exit side of a motor vehicle.

FIG. 2 shows a simplified schematic representation of a first embodiment of a device 20 for identifying an exit side of a motor vehicle. The device 20 has an input 21 through which data from motor vehicle sensors, navigation data or other information can be received. The device 20 moreover has a unit 22 for determining a driving situation by means of which the existence of an exit situation can be detected. The existence of an exit situation can for example be assumed when the motor vehicle has reached a previously detected driving goal, the driver has turned off the motor vehicle, or a vehicle passenger unlocks his safety belt when the motor vehicle is at a standstill. It is likewise possible to detect the existence of an exit situation by components outside of the device 20. In this case, corresponding information can be transmitted via the input 21 to the device 20. An analytical unit ascertains an exit side of the motor vehicle when an exit situation exists. For this, data from the motor vehicle sensors can be used in that for example curbs, buildings, vehicles or persons in the surroundings of the motor vehicle are detected in the surroundings of the motor vehicle. Alternatively, the exit side can also be ascertained by means of a position of the motor vehicle from map data. A control unit 24 then simulates the opening of a door on the ascertained exit side. For this, a brightness for example can be increased on the ascertained exit side, optionally over the entire length of the interior of the motor vehicle, or at least in a door region. To increase the brightness, a luminosity of lighting can be adapted. Alternatively or in addition, a transparency of a window can also be increased, such as when using electrochromic windowpanes. It is also possible to reproduce outside sounds, at least in a door region on the ascertained exit side to simulate the opening of the door. The outside noises can be simulated outside noises, or real outside noises detected by a microphone. An air stream generated at least in a door region on the ascertained exit side can be another possibility. Of course, all or some of the various approaches for simulating the opening of the door can also be combined or implemented in a desired temporal sequence. Control commands from the control unit 24 are output to an output 27 of the device 20 to corresponding control units of the motor vehicle.

The unit 22 for determining a driving situation, the analytical unit 23 and the control unit 24 can be controlled by a control unit 25. If necessary, settings of the unit 22 for determining a driving situation, the analytical unit 23, the control unit 24 or the control unit 25 can be changed by means of a user interface 28. The data accumulating in the device 20 can be filed as needed in a memory 26 of the device 20, for example for later evaluation, or for use by the components of the device 20. The unit 22 for determining a driving situation, the analytical unit 23, the control unit 24 as well as the control unit 25 can be realized as dedicated hardware, such as integrated circuits. Of course, they can however also be partially or completely combined or implemented as software that runs on a suitable processor such as a GPU (GPU: graphics processing unit). The input 21 and output 27 can be implemented as separate interfaces, or as a combined bidirectional interface.

Figure 3:
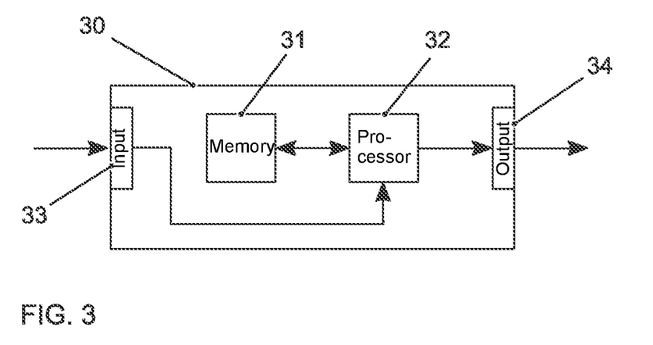
FIG. 3 shows a second embodiment of a device for identifying an exit side of a motor vehicle.

FIG. 3 shows a simplified schematic representation of a second embodiment of a device 30 for identifying an exit side of a motor vehicle. The device 30 has a processor 32 and a memory 31. For example, the device 30 is a computer or control unit. Instructions are filed in the memory 31 that, when run by the processor 32, cause the device 30 to execute the steps according to one of the described methods. The instructions filed in the memory 31 thus embody a program that can be run by the processor 32 and that realizes the method according to the present embodiment. The device 30 has an input 33 for receiving data from a sensor system of the motor vehicle, such as from a front camera of the motor vehicle, or from lidar, radar or ultrasonic sensors, or from data of a navigation system of the motor vehicle. Data generated by the processor 32 are provided by an output 34. Moreover, they can be filed in the memory 31. The input 33 and the output 34 can be combined into a bidirectional interface.

The processor 32 can comprise one or more processor units such as microprocessors, digital signal processors, or combinations thereof.

The memory 26, 31 of the described embodiments can have volatile as well as non-volatile memory sections and can comprise a wide range of memory units and media such as hard disks, optical storage media or semiconductor memories.

Figure 4:
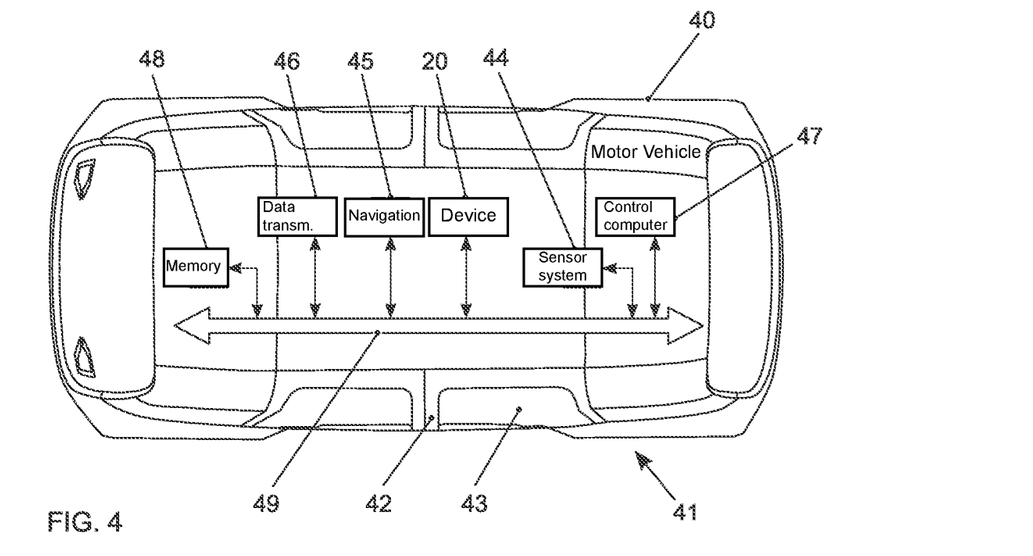
FIG. 4 schematically portrays a fully automated motor vehicle in which a solution according to an embodiment is realized.

FIG. 4 schematically portrays a fully automated motor vehicle 40 in which a solution according to the present embodiment is realized. The motor vehicle 40 has a device 20 for identifying an exit side 41. For this, the device 20 can indirectly or directly control components in the doors 42 or windows 43 of the motor vehicle 40. The components of the motor vehicle 40 are a surround sensor system 44, a navigation system 45, a data transmission unit 46 as well as a control computer 47 for controlling the motor vehicle 40. By means of the transmission unit 46, for example a connection to service providers can be established. Based on the data from the surround sensor system 44 which can for example comprise a camera as well as lidar, radar or ultrasonic sensors, inter alia curbs, buildings, vehicles or persons in the environment of the motor vehicle can be detected. A memory 48 is provided for saving data. The data between the different components of the motor vehicle 40 are exchanged via a network 49.

In the following, examples of the operation of the solution according to some embodiments will be explained with reference to FIGS. 5 to 8. The interior of a motor vehicle in different states is portrayed in the figures.

Figure 5:
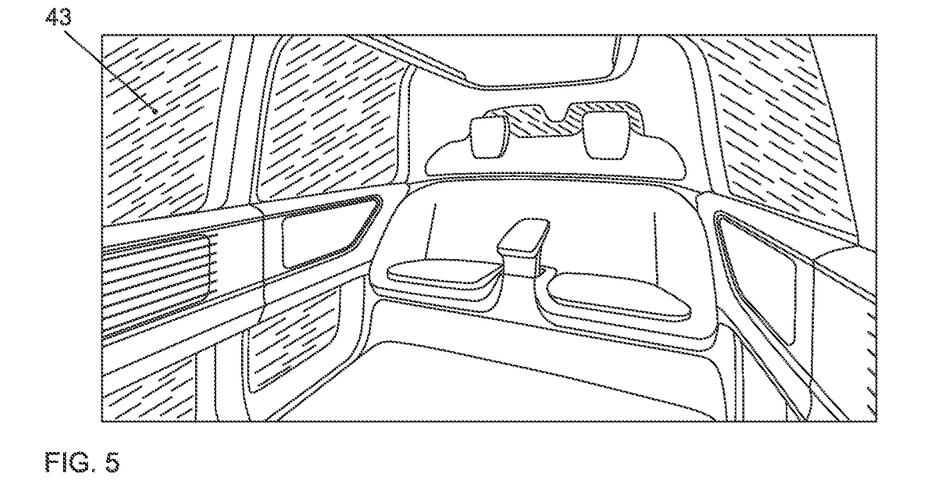
FIG. 5 shows an interior of a motor vehicle in an initial state.

FIG. 5 shows an interior of a motor vehicle in an initial state. The windowpanes are tinted relatively strong, which is indicated by the hatching of the windows 43, and nearly no sounds from the outside enter the interior. This is the normal state while driving, or respectively as long as no exit situation has been detected.

Figure 6:
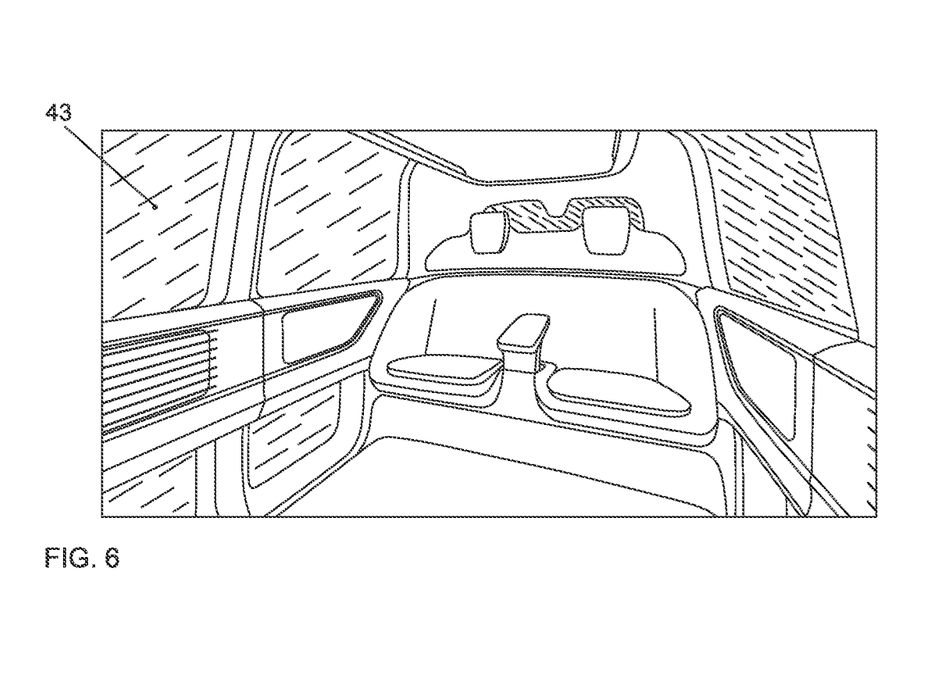
FIG. 6 shows the interior of the motor vehicle with a brightened exit side.

FIG. 6 shows the interior of the motor vehicle with a brightened exit side. On the exit side, the tint of the windowpanes decreases so that more light enters the interior. This is indicated by the reduced hatching of the windows 43. In the shown example, the increase in transparency is not just limited to the door region, but also extends over a larger area of the interior.

Figure 7:
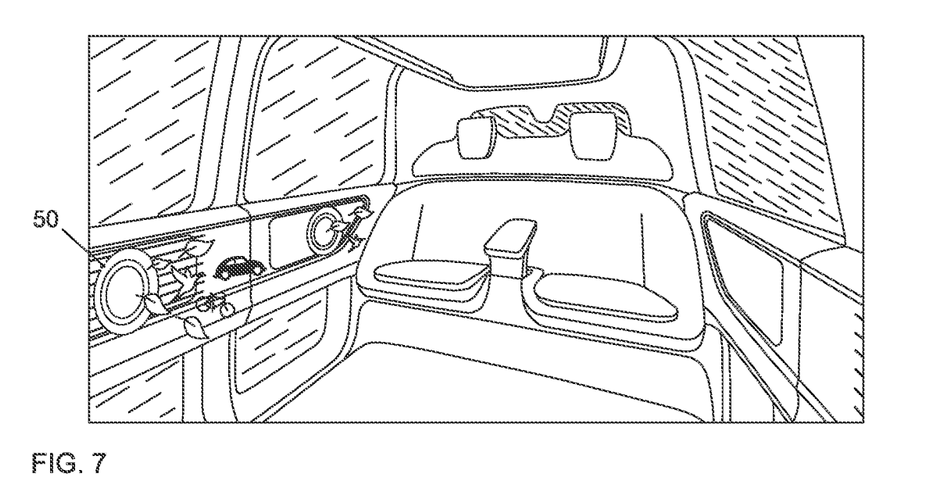
FIG. 7 shows the interior of the motor vehicle with an indicated additional reproduction of outside sounds.

FIG. 7 shows the interior of the motor vehicle with an indicated additional reproduction of outside sounds. For this, sounds from the outside are recorded and introduced by speakers 50 from the direction of the door into the interior. Alternatively, simulated outside noises are reproduced.

Figure 8:
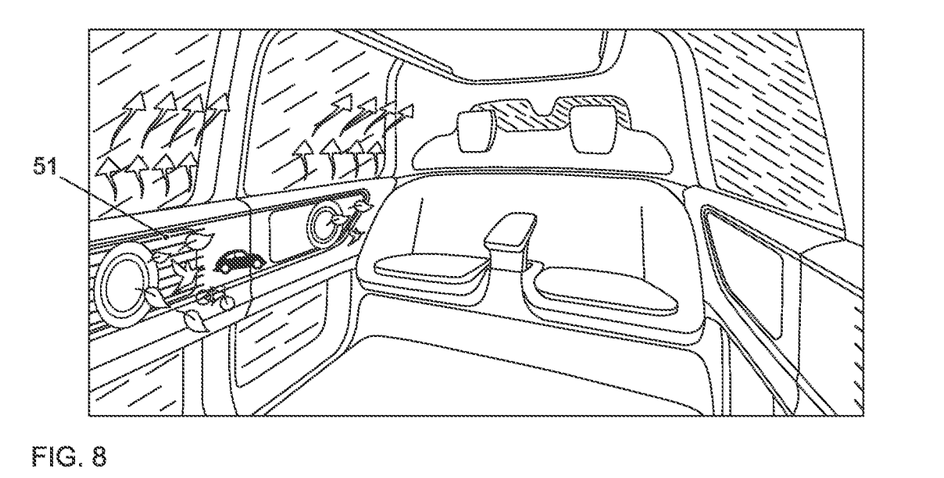
FIG. 8 shows the interior of the motor vehicle with an indicated additional generation of an air stream.

FIG. 8 shows the interior of the motor vehicle with an indicated additional generation of an air stream. A perceptible air stream passes through ventilation slots 51 from the side of the door into the vehicle interior.

The described possibilities of simulating the opening of a door can be combined with each other as desired, wherein only individual approaches can also be used. Likewise, temporal sequences can be realized in that for example first the brightness is increased, and then outside noises and an air flow are only added after a certain time span.

When simulating the opening of the door, the time of day can also be taken into consideration. Accordingly for example, increasing the transparency of the window at night when there is no outside light only has a slight effect, and it may be therefore more reasonable to change the lighting. Likewise, relatively few real outside sounds occur at night, so it is better to reproduce simulated outside sounds.

Another option is to take into account environmental parameters. In a loud environment or an unpleasant noise background, it may be an option to only reproduce simulated outside sounds instead of real outside sounds, or to filter the real outside sounds or reproduce them at a reduced volume. When the sunlight is particularly bright, it can in turn may make sense to only increase the transparency of a window slightly so that the vehicle passenger is not blinded.

The associated parameters for the user of the motor vehicle can be configured such that the user can determine which of the described approaches are used and how they should be configured.

REFERENCE NUMBER LIST

10 Detecting an exit situation
11 Ascertaining an exit side
12 Simulating a door opening on the exit side
20 Device
21 Input
22 Unit for determining a driving situation
23 Analytical unit
24 Control unit
25 Control unit
26 Memory
27 Exit
28 User interface
30 Device
31 Memory
32 Processor
33 Input
34 Output
40 Motor vehicle
41 Exit side
42 Door
43 Window
44 Surround sensor system
45 Navigation system
46 Data transmission unit
47 Control computer
48 Memory
49 Network
50 Speaker
51 Ventilation The invention has been described in the preceding using various exemplary embodiments. Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor, module or other unit or device may fulfil the functions of several items recited in the claims.

The mere fact that certain measures are recited in mutually different dependent claims or embodiments does not indicate that a combination of these measured cannot be used to advantage. Any reference signs in the claims should not be construed as limiting the scope.

What is claimed is:

1. A system for identifying an exit side of a motor vehicle having:
   at least one of a vehicle sensor for acquiring and determining external environmental data of an external environment surrounding the motor vehicle, acquired based on an actual position of the motor vehicle; and a navigation system for determining position data of the motor vehicle;
   circuitry, connected with one or more of the vehicle sensor and the navigation system, wherein the circuitry is adapted for identifying the exit side of the motor vehicle based on one or more of the external environmental data and the position data; and
   a controller, connected with the circuitry, the controller being configured for replicating an opening of a door on the identified exit side using a stimulus on the identified exit side, wherein the stimulus is perceivable by a vehicle occupant;
   wherein the replicating of the opening of the door comprises: replicating to the vehicle occupant, before the vehicle occupant gets off from the motor vehicle and without opening the door, at least part of the external environment surrounding the motor vehicle.

2. The system for identifying the exit side of the motor vehicle of claim 1, wherein the stimulus comprises one or more of light, sound, and air.

3. The system for identifying the exit side of the motor vehicle of claim 1, further comprising a lighting unit, wherein the controller replicates the opening of the door by increasing a brightness of light, emitted by the lighting unit at least in a door region on the exit side.

4. The system for identifying the exit side of the motor vehicle of claim 1, further comprising a lighting unit, wherein the controller replicates the opening of the door by changing a luminosity of light, emitted by the lighting unit at least in a door region on the exit side.

5. The system for identifying the exit side of the motor vehicle of claim 1, wherein the controller replicates the opening of the door by controlling a transparency of at least one window of the vehicle on the exit side.

6. The system for identifying the exit side of the motor vehicle of claim 1, further comprising a speaker, wherein the controller replicates the opening of the door by reproducing outside sounds at least in a door region on the exit side.

7. The system for identifying the exit side of the motor vehicle of claim 1, wherein the controller replicates the opening of the door by controlling an air stream at least in a door region on the exit side.

8. The system for identifying the exit side of the motor vehicle of claim 1, wherein the circuitry is configured to identify the exit side by determining at least one of a curb, a building, a vehicle, or a person in a surrounding of the motor vehicle from the external environmental data.

9. A motor vehicle, wherein the motor vehicle comprises a system for identifying an exit side of the motor vehicle, the system having:

at least one of a vehicle sensor for acquiring and determining external environmental data of an external environment surrounding the motor vehicle, acquired based on an actual position of the motor vehicle; and a navigation system for determining position data of the motor vehicle;

circuitry, connected with one or more of the vehicle sensor and the navigation system, wherein the circuitry is adapted for identifying the exit side of the motor vehicle based on one or more of the external environmental data and the position data; and a controller, connected with the circuitry, the controller being configured for replicating an opening of a door on the identified exit side using a stimulus on the identified exit side, wherein the stimulus is perceivable by a vehicle occupant;

wherein the replicating of the opening of the door comprises: replicating to the vehicle occupant, before the vehicle occupant gets off from the motor vehicle and without opening the door, at least part of the external environment surrounding the motor vehicle.

* * * * *